US009964029B1

(12) United States Patent
Loberger et al.

(10) Patent No.: US 9,964,029 B1
(45) Date of Patent: May 8, 2018

(54) ALTERNATOR CONFIGURATIONS FOR OUTBOARD MOTORS

(71) Applicant: Brunswick Corporation, Lake Forest, IL (US)

(72) Inventors: Wade A. Loberger, Oshkosh, WI (US); Mark J. Glodowski, De Pere, WI (US); Steven J. Gonring, Slinger, WI (US)

(73) Assignee: Brunswick Corporation, Mettawa, IL (US)

( * ) Notice: Subject to any disclaimer, the term of this patent is extended or adjusted under 35 U.S.C. 154(b) by 0 days. days.

(21) Appl. No.: 15/332,568

(22) Filed: Oct. 24, 2016

(51) Int. Cl.

| | |
|---|---|
| ***B63H 21/14*** | (2006.01) |
| ***F02B 63/04*** | (2006.01) |
| ***B63H 20/00*** | (2006.01) |
| ***F02B 61/04*** | (2006.01) |
| ***F01N 13/08*** | (2010.01) |
| ***F01N 13/00*** | (2010.01) |
| ***F02F 7/00*** | (2006.01) |
| *F16F 3/087* | (2006.01) |
| *F16F 15/30* | (2006.01) |

(52) U.S. Cl.
CPC ......... *F02B 63/042* (2013.01); *B63H 20/001* (2013.01); *B63H 21/14* (2013.01); *F01N 13/004* (2013.01); *F01N 13/08* (2013.01); *F02B 61/045* (2013.01); *F02F 7/0012* (2013.01); *F16F 3/0876* (2013.01); *F16F 15/30* (2013.01)

(58) Field of Classification Search
CPC ...... B63H 20/001; B63H 21/14; F02B 63/042
See application file for complete search history.

(56) References Cited

U.S. PATENT DOCUMENTS

| | | | | |
|---|---|---|---|---|
| 3,402,325 | A | 9/1968 | Minks | |
| 3,890,948 | A | 6/1975 | Minks | |
| 4,160,435 | A | 7/1979 | Sleder | |
| 4,418,677 | A | 12/1983 | Hofmann | |
| 5,899,778 | A * | 5/1999 | Hiraoka | F02B 61/045 123/184.21 |
| 6,857,917 | B1 | 2/2005 | Wasilewski | |
| 7,362,018 | B1 | 4/2008 | Kulogo et al. | |
| 9,174,818 | B1 * | 11/2015 | Langenfeld | B63H 21/34 |
| 2003/0008573 | A1 * | 1/2003 | Katayama | F01L 1/3442 440/84 |

* cited by examiner

*Primary Examiner* — Stephen P Avila
(74) *Attorney, Agent, or Firm* — Andrus Intellectual Property Law, LLP

(57) ABSTRACT

A marine engine has a cylinder block with first and second banks of piston-cylinders that are vertically aligned and extend transversely with respect to each other in a V-shape so as to define a valley there between. A crankshaft is caused to rotate by the first and second banks of piston-cylinders. A flywheel is coupled to the upper end of the crankshaft such that rotation of the crankshaft causes rotation of the flywheel. An alternator is located above the cylinder block and coupled to the flywheel such that rotation of the flywheel operates the alternator.

18 Claims, 6 Drawing Sheets

ALTERNATOR CONFIGURATIONS FOR OUTBOARD MOTORS

FIELD

The present disclosure relates to outboard motors and particularly to alternator configurations for outboard motors.

BACKGROUND

The following U.S. Patents are incorporated herein by reference in entirety:

U.S. Pat. No. 3,890,948 discloses a capacitor discharge ignition system including an alternator having a pair of windings to charge a capacitor which is connected in a series output circuit with a pulse transformer and a silicon controlled rectifier.

U.S. Pat. No. 4,160,435 discloses an engine flywheel that forms the common rotor for a dual alternator unit having a first ignition alternator for the ignition circuit and a second power alternator for battery charging and providing other auxiliary power.

U.S. Pat. No. 4,418,677 discloses an alternator driven by an engine crankshaft. A stator mounted on the engine includes circumferentially spaced power coils lying in the plane of and radially inward of the power magnets mounted on the engine flywheel. Ignition coils are mounted circumferentially spaced from the power magnets, but axially offset therefrom to couple with the fringe flux of the power magnets, thus allowing a high output from the power coils without overloading the ignition coils.

U.S. Pat. No. 6,857,917 discloses a method for controlling the operation of the alternator in such a way that during certain conditions, such as rapid acceleration of a marine vessel in combination with a trimming maneuver, the alternator of the marine propulsion system is deactivated so that it does not provide a mechanical load on the engine during the accelerating maneuvers. This allows the engine to provide more power to the propeller and achieve the desired operating speed commanded by the operator of a marine vessel.

U.S. Pat. No. 7,362,018 discloses an encoder alternator for an internal combustion engine having a rotor with a plurality of circumferential magnetic rotor poles in a periodic pattern except for at least one magnetic irregularity. A sensor coil is wound around a stator pole and outputs a crankshaft position sensor signal when the magnet irregularity of the rotor passes the stator pole.

U.S. Pat. No. 9,174,818 discloses marine engines including a cylinder block having first and second banks of cylinders that are disposed along a longitudinal axis and extend transversely with respect to each other in a V-shape so as to define a valley there between. A catalyst receptacle is disposed at least partially in the valley and contains at least one catalyst that treats exhaust gas from the marine engine. A conduit conveys the exhaust gas from the marine engine to the catalyst receptacle. The conduit receives the exhaust gas from the first and second banks of cylinders and conveys the exhaust gas to the catalyst receptacle. The conduit reverses direction only once with respect to the longitudinal axis.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

A marine engine has a cylinder block with first and second banks of piston-cylinders that are vertically aligned and that extend transversely with respect to each other in a V-shape so as to define a valley there between. A crankshaft is caused to rotate by the first and second banks of piston-cylinders. A flywheel is coupled to the upper end of the crankshaft such that rotation of the crankshaft causes rotation of the flywheel. An alternator is located above the cylinder block and coupled to the flywheel such that rotation of the flywheel operates the alternator.

An outboard motor comprises an internal combustion engine that extends from a top side to a bottom side along a vertical axis, from an aftward side to a forward side along a longitudinal axis that is perpendicular to the vertical axis, and from a port side to a starboard side along a transverse axis that is perpendicular to the vertical axis and perpendicular to the longitudinal axis. The internal combustion engine has a first bank of piston-cylinders that are aligned with respect to the vertical axis and a second bank of piston-cylinders that are also aligned with respect to the vertical axis. The first and second banks of piston-cylinders extend transversely to each other in a V-shape so as to define a valley there between. A crankshaft extends parallel to the vertical axis and is caused to rotate by the first and second banks of piston-cylinders. A flywheel is coupled to the upper end of the crankshaft such that rotation of the crankshaft causes rotation of the flywheel. An alternator is located above the internal combustion engine and is coupled to the flywheel such that rotation of the flywheel operates the alternator.

BRIEF DESCRIPTION OF THE DRAWINGS

The present disclosure is described with reference to the following Figures. The same numbers are used throughout the Figures to reference like features and like components.

DETAILED DESCRIPTION OF THE DRAWINGS

Figure 1:
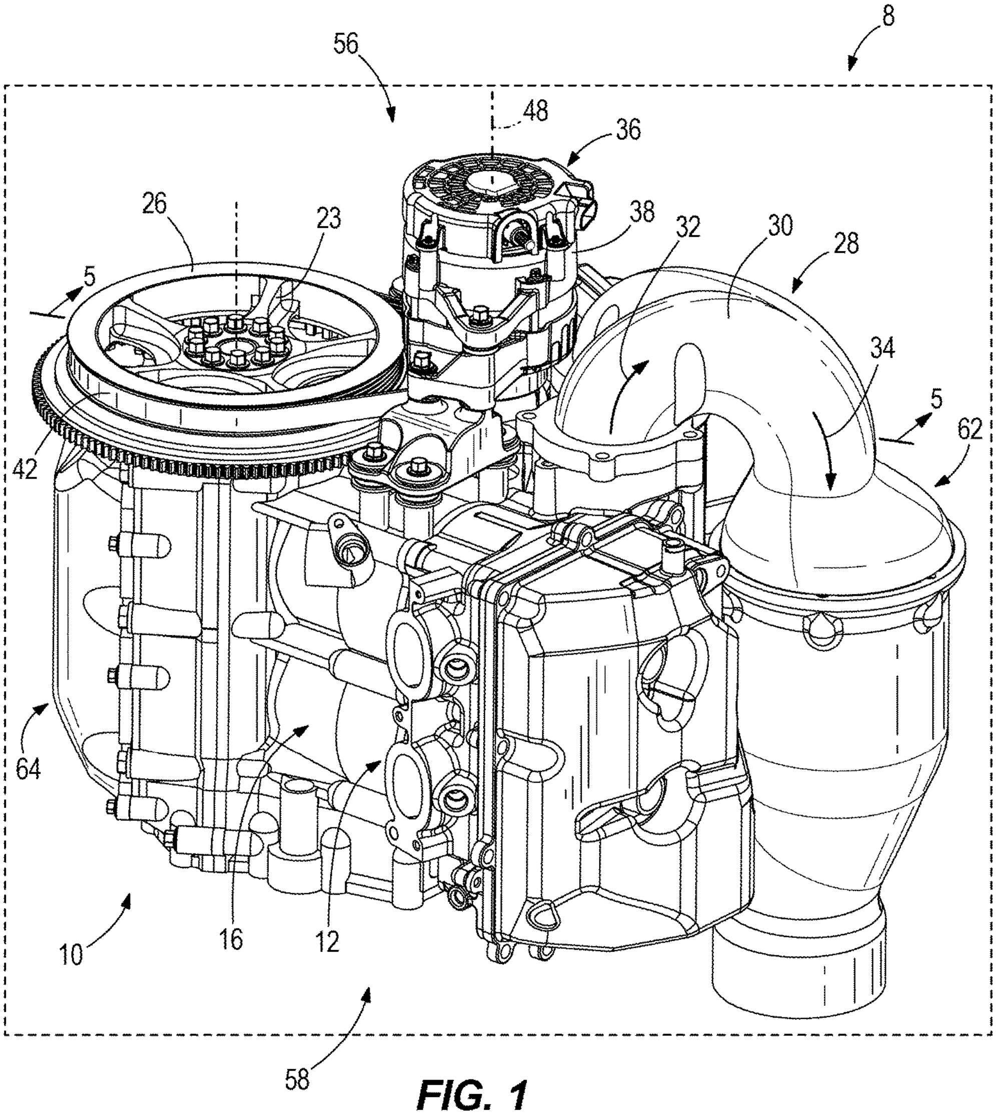
FIG. 1 is a perspective view from one side of a marine engine having a cylinder block and an alternator located above the cylinder block.
Figure 2:
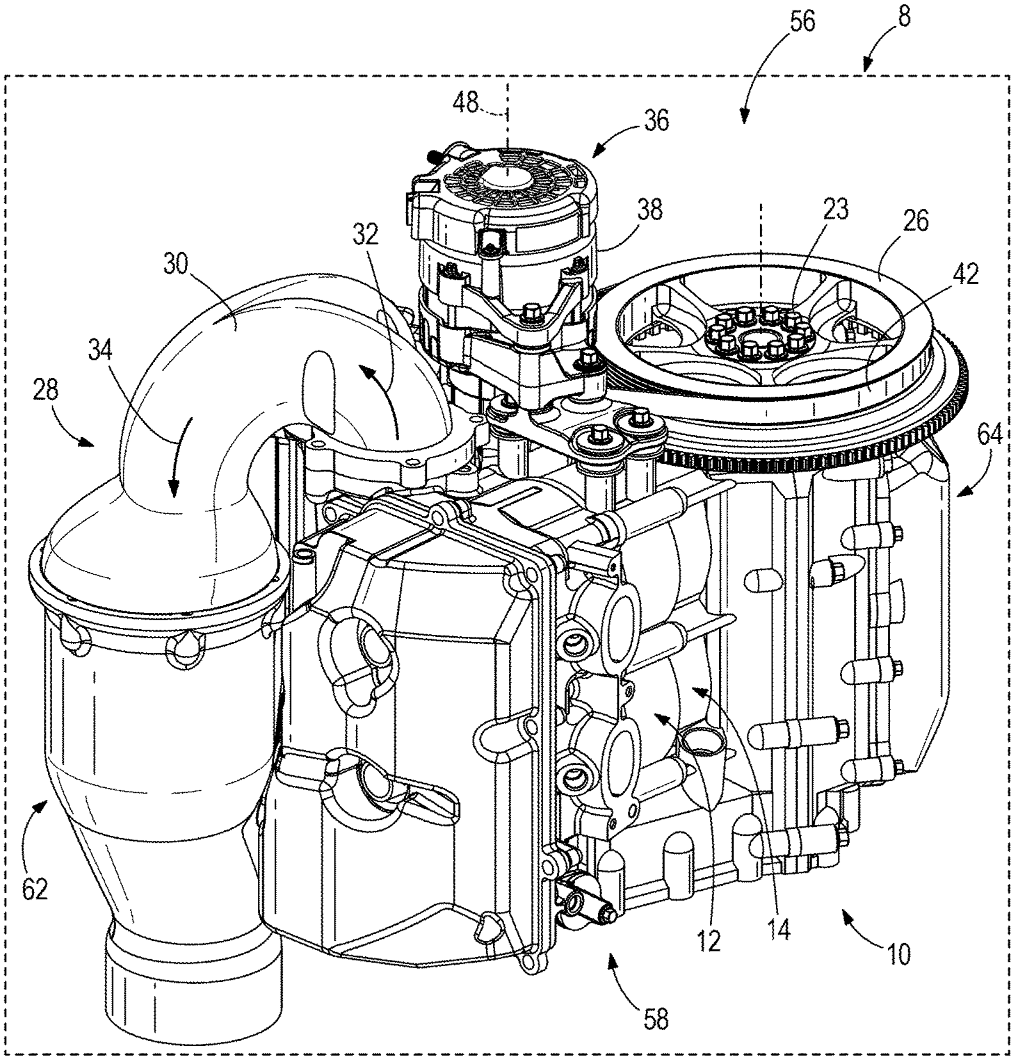
FIG. 2 is a perspective view from an opposite side of the marine engine.
Figure 3:
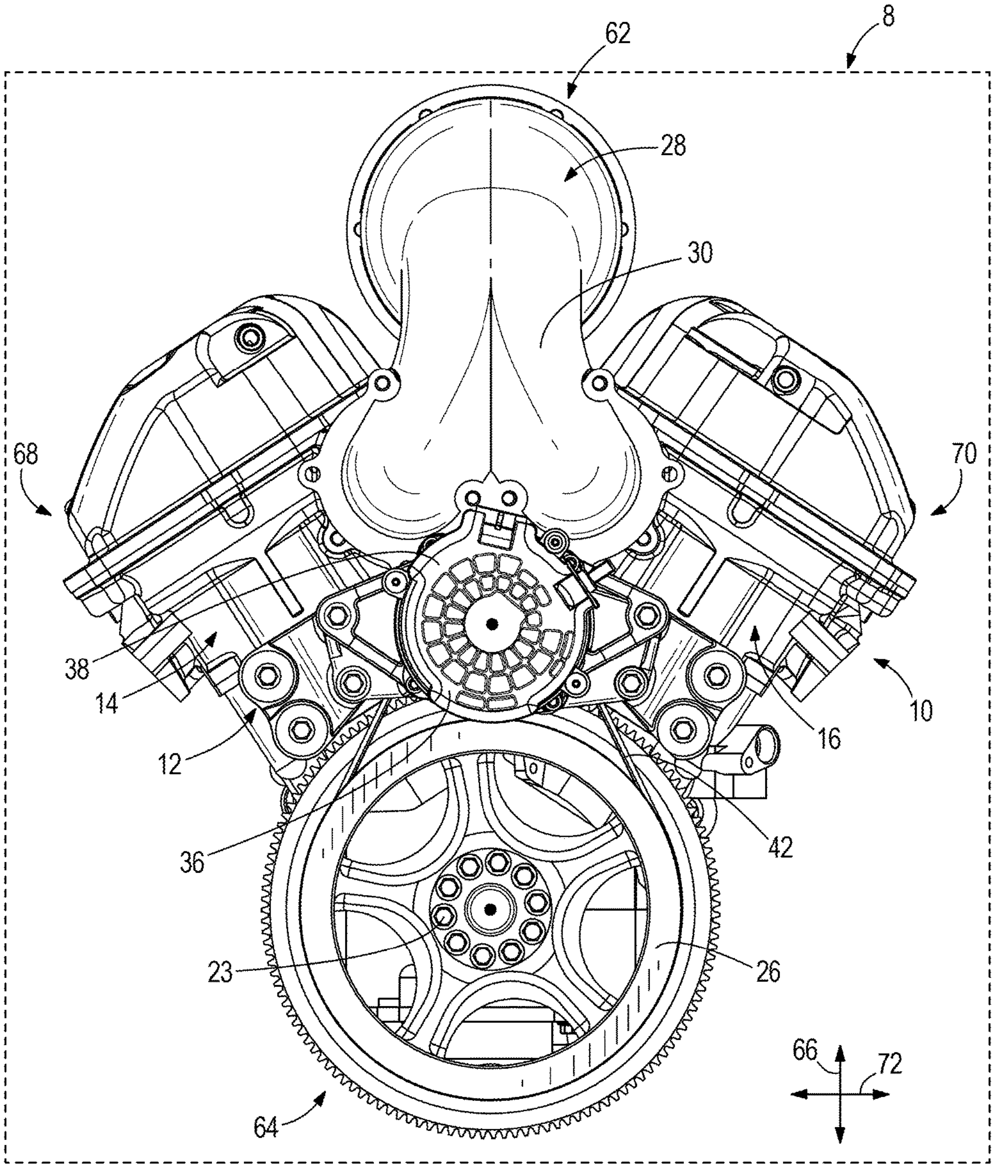
FIG. 3 is a top view of the marine engine.

FIGS. 1-5 depict an outboard motor 8 having a marine engine 10. In the illustrated example, the marine engine 10 is an internal combustion engine, which is configured similarly to the internal combustion engine disclosed in the above incorporated U.S. Pat. No. 9,174,818. The marine engine 10 has a cylinder block 12 having first and second banks of piston-cylinders 14, 16, each of which are vertically aligned. The first and second banks of piston-cylinders extend transversely with respect to each other in a V-shape so as to define a valley there between. As is conventional, the marine engine 10 has a vertically extending crankshaft 20 (see FIG. 5) that is caused to rotate under force of combustion within the first and second banks of piston-cylinders 14, 16. The crankshaft 20 has an upper end 25 that extends vertically upwardly from the cylinder block 12. A flywheel 26 is coupled to the upper end 25 by fasteners 23 such that rotation of the crankshaft 20 causes rotation of the flywheel 26. The flywheel 26 extends transversely (i.e. horizontally) with respect to the vertically extending crankshaft 20. An exhaust conduit 28 conveys exhaust gases produced by the combustion process in the first and second banks of piston-cylinders 14, 16. Similar to the internal combustion engine disclosed in the '818 patent, the exhaust conduit 28 is disposed at least partially within the valley. The exhaust conduit 28 includes a "180° bend" 30 that conveys the exhaust gas from a vertically upward directional flow shown at arrow 32 (see FIG. 1) to a vertically downward directional flow, shown at arrow 34. At least a portion of the 180° bend 30 extends vertically higher than the first and second banks of piston-cylinders 14, 16.

Figure 4:
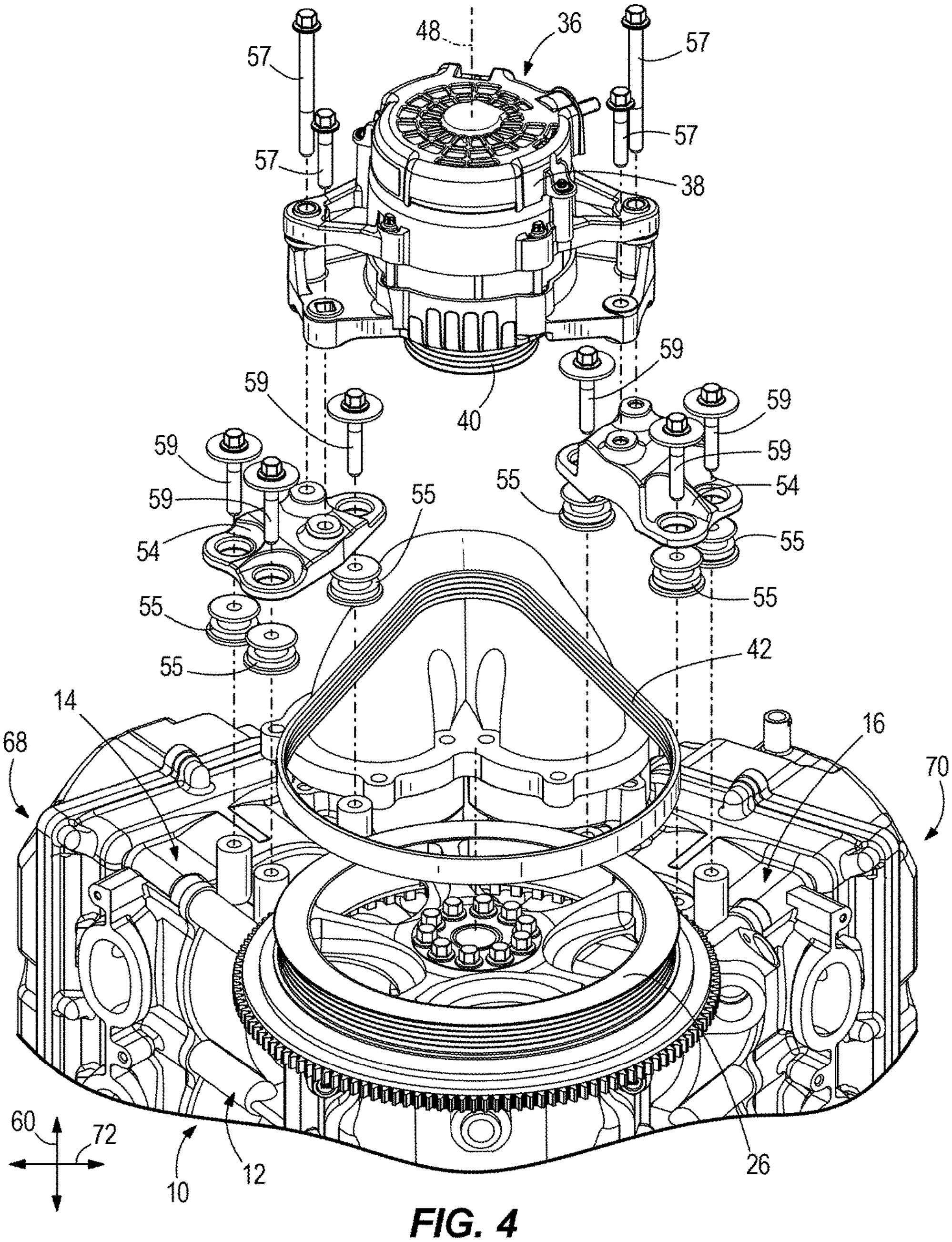
FIG. 4 is an exploded view, showing the alternator and components for connecting the alternator to the marine engine.
Figure 5:
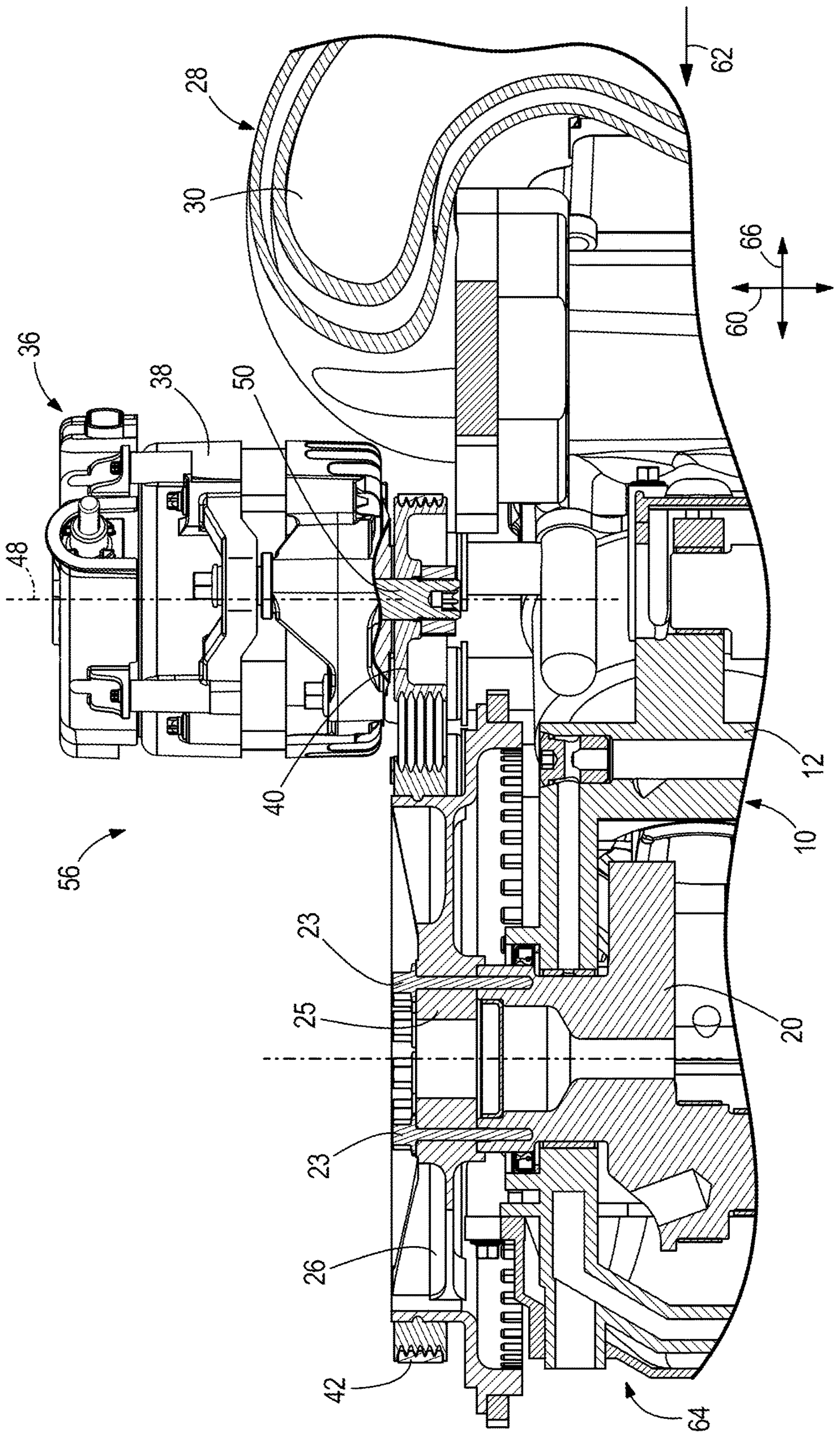
FIG. 5 is a view of section 5-5, taken in FIG. 1
Figure 6:
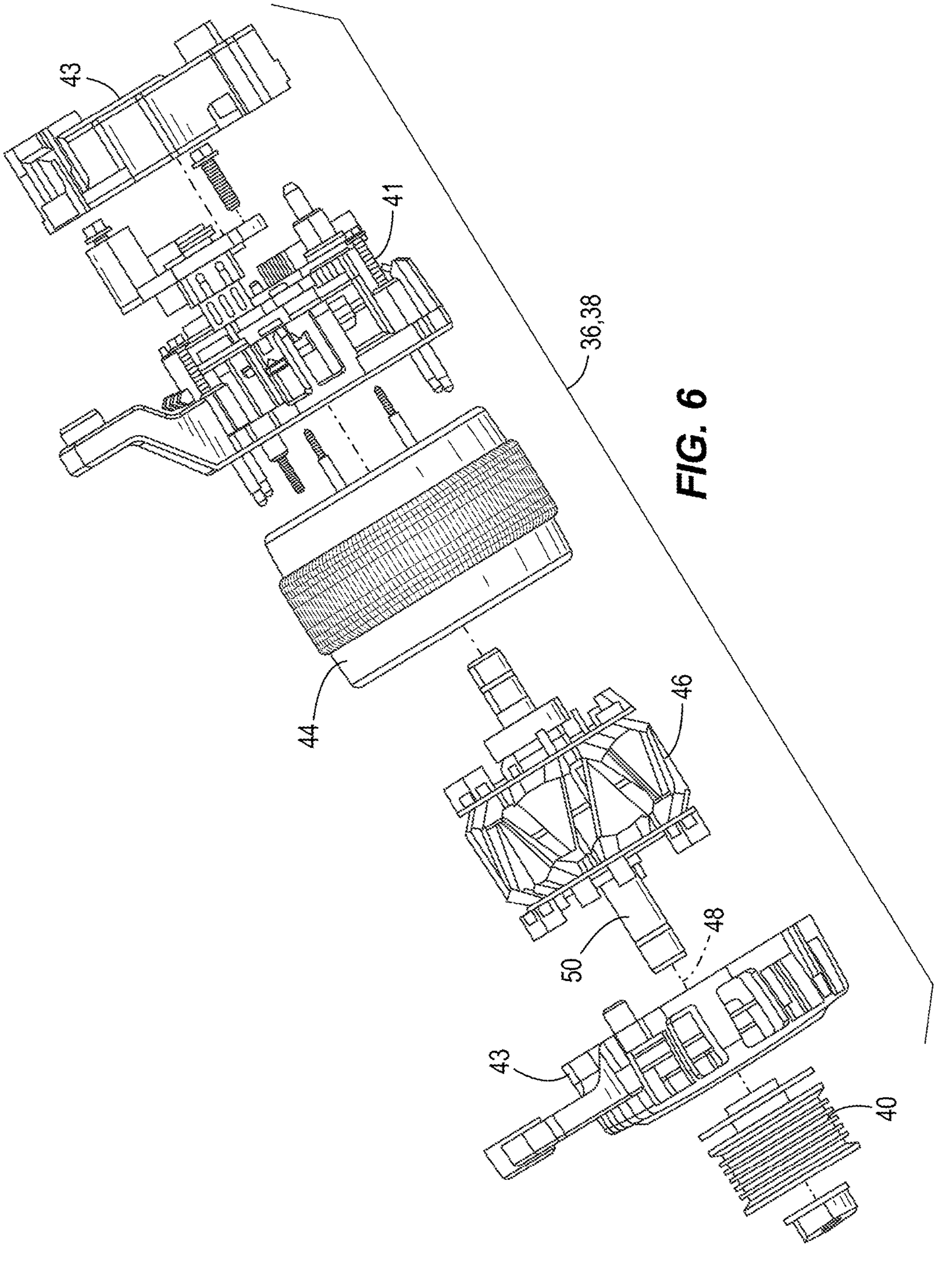
FIG. 6 is an exploded view of one example of the alternator.

According to the present disclosure, an alternator 36 is located above the cylinder block 12 and is coupled to the flywheel 26 such that rotation of the flywheel 26 operates the alternator 36. The alternator 36 includes a body 38 and a pulley 40 (see FIG. 5). The pulley 40 is located vertically below the body 38 and is operably connected to the flywheel 26 such that rotation of the flywheel 26 causes rotation of the pulley 40. The manner of connection between the flywheel 26 and pulley 40 can vary from that which is shown. In the illustrated example, a belt 42 connects the flywheel 26 to the pulley 40 such that rotation of the flywheel 26 causes rotation of the pulley 40. The type and configuration of the alternator can vary from what is shown. In the example illustrated in FIG. 6, the body 38 of the alternator 36 includes a housing or cover 43 that encloses a rectifier 41, a stator 44, and a rotor 46, which rotates about a vertical rotor axis 48, which is parallel to the vertically extending crankshaft 20. The rotor 46 is coupled to the pulley 40 via a rotor center shaft 50, which defines the rotor axis 48. In other examples, the alternator 36 could be one of the type and configuration described in the above-incorporated patents or other known configurations. Referring to FIG. 4, the alternator 36 is coupled to the marine engine 10 via mounting brackets 54 and a plurality of a shock absorbers 55, which are made of resilient (e.g. rubber) material, thereby providing a resilient shock absorbing connection. Fasteners 57 connect the alternator 36 to the brackets 54 and fasteners 59 connect the brackets 54 and shock absorbers 55 to the marine engine 10. Again, the manner in which the alternator 36 is coupled to the marine engine 10 can vary from that which is shown.

It will thus be seen that the present disclosure provides a marine engine 10 (here an internal combustion engine) that extends from a top side 56 to a bottom side 58 along a vertical axis 60, from an aftward side 62 to a forward side 64 along a longitudinal axis 66 that is perpendicular to the vertical axis 60, and from a port side 68 to a starboard side 70 along a transverse axis 72 that is perpendicular to the vertical axis 60 and perpendicular to the longitudinal axis 66. The marine engine 10 has a first bank of piston-cylinders 14 that are aligned with respect to the vertical axis 60 and a second bank of piston-cylinders 16 that are also aligned with respect to the vertical axis 60. The first and second banks of piston-cylinders 14, 16 extend transversely to each other in the noted V-shape as to define the valley there between. The crankshaft 20 extends parallel to the vertical axis 60 and is caused to rotate by combustion in the first and second banks of piston-cylinders 14, 16. The flywheel 26 is coupled to the upper end 25 of the crankshaft 22 such that rotation of the crankshaft 22 causes rotation of the flywheel 26. The alternator 36 is located above the engine 10 and is coupled to the flywheel 26 such that rotation of the flywheel 26 operates the alternator 36.

In the illustrated example, the alternator 36 is disposed closer to the aftward side 62 than the flywheel 26. The flywheel 26 is located closer to the forward side 64 than the alternator 36. The alternator 36 is located equidistant between the port side 68 and the starboard side 70. The alternator 36 is located forward of and vertically above the valley. The belt 42 extends parallel to the longitudinal axis 66 and perpendicular to the vertical axis 60. The alternator 36 is disposed closer to the forward side 64 than the exhaust conduit 28. The alternator 36 is disposed between the exhaust conduit 28 and the flywheel 26 with respect to a horizontal direction 52, which is perpendicular to the crankshaft 20. More particularly, the alternator 36 is disposed between the 180° bend 30 and the flywheel 26.

In the present description, certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A marine engine comprising:

a cylinder block having first and second banks of piston-cylinders that are vertically aligned and extend transversely with respect to each other in a V-shape so as to define a valley there between;

a crankshaft that is caused to rotate by the first and second banks of piston-cylinders, the crankshaft having an upper end;

a flywheel coupled to the upper end of the crankshaft such that rotation of the crankshaft causes rotation of the flywheel; and an alternator located above the cylinder block and coupled to the flywheel such that rotation of the flywheel operates the alternator;

wherein the alternator comprises a body and a pulley, wherein the pulley is located below the body and is connected to the flywheel such that rotation of the flywheel causes rotation of the pulley.

2. The marine engine according to claim 1, further comprising a belt that connects the flywheel to the pulley such that rotation of the flywheel causes rotation of the pulley.

3. The marine engine according to claim 1, wherein the alternator comprises a stator and a rotor that rotates about a center axis and is coupled to the pulley.

4. The marine engine according to claim 3, further comprising a rotor center shaft that connects the rotor to the pulley.

5. The marine engine according to claim 1, further comprising an exhaust conduit that conveys exhaust gas from the first and second banks of piston-cylinders, wherein the exhaust conduit is disposed in the valley.

6. The marine engine according to claim 5, wherein the alternator is disposed between the exhaust conduit and the flywheel.

7. A marine engine comprising:

a cylinder block having first and second banks of piston-cylinders that are vertically aligned and extend transversely with respect to each other in a V-shape so as to define a valley there between;

a crankshaft that is caused to rotate by the first and second banks of piston-cylinders, the crankshaft having an upper end;

a flywheel coupled to the upper end of the crankshaft such that rotation of the crankshaft causes rotation of the flywheel;

an alternator located above the cylinder block and coupled to the flywheel such that rotation of the flywheel operates the alternator; and an exhaust conduit that conveys exhaust gas from the first and second banks of piston-cylinders, wherein the exhaust conduit is disposed in the valley;

wherein the alternator is disposed between the exhaust conduit and the flywheel; and wherein the exhaust conduit comprises a 180-degree bend that extends higher than the first and second banks of piston-cylinders, wherein the 180-degree bend conveys the exhaust gas from an upward directional flow to a downward directional flow, and wherein the alternator is disposed between the 180-degree bend and the flywheel.

8. A marine engine comprising:

a cylinder block having first and second banks of piston-cylinders that are vertically aligned and extend transversely with respect to each other in a V-shape so as to define a valley there between;

a crankshaft that is caused to rotate by the first and second banks of piston-cylinders, the crankshaft having an upper end;

a flywheel coupled to the upper end of the crankshaft such that rotation of the crankshaft causes rotation of the flywheel;

an alternator located above the cylinder block and coupled to the flywheel such that rotation of the flywheel operates the alternator; and a shock absorber that couples the alternator to the cylinder block.

9. An outboard motor comprising:

an internal combustion engine that extends from a top side to a bottom side along a vertical axis, from an aftward side to a forward side along a longitudinal axis that is perpendicular to the vertical axis, and from a port side to a starboard side along a transverse axis that is perpendicular to the vertical axis and perpendicular to the longitudinal axis;

wherein the internal combustion engine has a first bank of piston-cylinders that are aligned with respect to the vertical axis and a second bank of piston-cylinders that are aligned with respect to the vertical axis, and wherein the first and second banks of piston-cylinders extend transversely to each other in a V-shape so as to define a valley there between;

a crankshaft that extends parallel to the vertical axis and is caused to rotate by the first and second banks of piston-cylinders, wherein the crankshaft has an upper end;

a flywheel coupled to the upper end of the crankshaft such that rotation of the crankshaft causes rotation of the flywheel; and an alternator located above the internal combustion engine and coupled to the flywheel such that rotation of the flywheel operates the alternator;

wherein the alternator is disposed closer to the aftward side than the flywheel and wherein the flywheel is located closer to the forward side than the alternator.

10. An outboard motor comprising:

an internal combustion engine that extends from a top side to a bottom side along a vertical axis, from an aftward side to a forward side along a longitudinal axis that is perpendicular to the vertical axis, and from a port side to a starboard side along a transverse axis that is perpendicular to the vertical axis and perpendicular to the longitudinal axis;

wherein the internal combustion engine has a first bank of piston-cylinders that are aligned with respect to the vertical axis and a second bank of piston-cylinders that are aligned with respect to the vertical axis, and wherein the first and second banks of piston-cylinders extend transversely to each other in a V-shape so as to define a valley there between;

a crankshaft that extends parallel to the vertical axis and is caused to rotate by the first and second banks of piston-cylinders, wherein the crankshaft has an upper end;

a flywheel coupled to the upper end of the crankshaft such that rotation of the crankshaft causes rotation of the flywheel; and an alternator located above the internal combustion engine and coupled to the flywheel such that rotation of the flywheel operates the alternator;

wherein the alternator is located equidistant from the port side and the starboard side, respectively.

11. The outboard motor according to claim 9, wherein the alternator is located forward of and above the valley.

12. An outboard motor comprising:

an internal combustion engine that extends from a top side to a bottom side along a vertical axis, from an aftward side to a forward side along a longitudinal axis that is perpendicular to the vertical axis, and from a port side to a starboard side along a transverse axis that is perpendicular to the vertical axis and perpendicular to the longitudinal axis;

wherein the internal combustion engine has a first bank of piston-cylinders that are aligned with respect to the vertical axis and a second bank of piston-cylinders that are aligned with respect to the vertical axis, and wherein the first and second banks of piston-cylinders extend transversely to each other in a V-shape so as to define a valley there between;

a crankshaft that extends parallel to the vertical axis and is caused to rotate by the first and second banks of piston-cylinders, wherein the crankshaft has an upper end;

a flywheel coupled to the upper end of the crankshaft such that rotation of the crankshaft causes rotation of the flywheel; and an alternator located above the internal combustion engine and coupled to the flywheel such that rotation of the flywheel operates the alternator;

wherein the alternator comprises a body and a pulley, wherein the pulley is located below the body and between the body and the internal combustion engine, wherein the alternator is connected to the flywheel such that rotation of the flywheel causes rotation of the pulley.

13. The outboard motor according to claim 12, further comprising a belt that connects the flywheel to the pulley such that rotation of the flywheel causes rotation of the pulley.

14. The outboard motor according to claim 13, wherein the belt extends parallel to the longitudinal axis and perpendicular to the vertical axis.

15. The marine engine according to claim 9, further comprising an exhaust conduit that conveys exhaust gas from the first and second banks of piston-cylinders, wherein the exhaust conduit is disposed in the valley, and wherein the alternator is disposed between the exhaust conduit and the flywheel.

16. An outboard motor comprising:

an internal combustion engine that extends from a top side to a bottom side along a vertical axis, from an aftward side to a forward side along a longitudinal axis that is perpendicular to the vertical axis, and from a port side to a starboard side along a transverse axis that is perpendicular to the vertical axis and perpendicular to the longitudinal axis;

wherein the internal combustion engine has a first bank of piston-cylinders that are aligned with respect to the vertical axis and a second bank of piston-cylinders that are aligned with respect to the vertical axis, and wherein the first and second banks of piston-cylinders extend transversely to each other in a V-shape so as to define a valley there between;

a crankshaft that extends parallel to the vertical axis and is caused to rotate by the first and second banks of piston-cylinders, wherein the crankshaft has an upper end;

a flywheel coupled to the upper end of the crankshaft such that rotation of the crankshaft causes rotation of the flywheel;

an alternator located above the internal combustion engine and coupled to the flywheel such that rotation of the flywheel operates the alternator; and an exhaust conduit that conveys exhaust gas from the first and second banks of piston-cylinders, wherein the exhaust conduit is disposed in the valley, and wherein the alternator is disposed between the exhaust conduit and the flywheel;

wherein the alternator is disposed closer to the forward side than the exhaust conduit.

17. The marine engine according to claim 16, wherein the exhaust conduit comprises a 180-degree bend located higher than the first and second banks of piston-cylinders, wherein the 180-degree bend conveys the exhaust gas from a upward directional flow to a downward directional flow, and wherein the alternator is disposed between the 180-degree bend and the flywheel.

18. An outboard motor comprising:

an internal combustion engine that extends from a top side to a bottom side along a vertical axis, from an aftward side to a forward side along a longitudinal axis that is perpendicular to the vertical axis, and from a port side to a starboard side along a transverse axis that is perpendicular to the vertical axis and perpendicular to the longitudinal axis;

wherein the internal combustion engine has a first bank of piston-cylinders that are aligned with respect to the vertical axis and a second bank of piston-cylinders that are aligned with respect to the vertical axis, and wherein the first and second banks of piston-cylinders extend transversely to each other in a V-shape so as to define a valley there between;

a crankshaft that extends parallel to the vertical axis and is caused to rotate by the first and second banks of piston-cylinders, wherein the crankshaft has an upper end;

a flywheel coupled to the upper end of the crankshaft such that rotation of the crankshaft causes rotation of the flywheel;

an alternator located above the internal combustion engine and coupled to the flywheel such that rotation of the flywheel operates the alternator; and a shock absorber that couples the alternator to the cylinder block, wherein the shock absorber is disposed between the alternator and the cylinder block.

* * * * *